(12) United States Patent
Liu et al.

(10) Patent No.: US 9,124,209 B2
(45) Date of Patent: Sep. 1, 2015

(54) METHOD AND APPARATUS FOR CONTROLLING POWER CONVERTER WITH INVERTER OUTPUT FILTER

(71) Applicants: Jingbo Liu, Grafton, WI (US); Thomas Nondahl, Greenfield, WI (US); Peter Schmidt, Franklin, WI (US); Semyon Royak, Beachwood, OH (US)

(72) Inventors: Jingbo Liu, Grafton, WI (US); Thomas Nondahl, Greenfield, WI (US); Peter Schmidt, Franklin, WI (US); Semyon Royak, Beachwood, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 129 days.

(21) Appl. No.: 13/742,405

(22) Filed: Jan. 16, 2013

(65) Prior Publication Data

US 2014/0197774 A1 Jul. 17, 2014

(51) Int. Cl.
| | |
|---|---|
| H02P 1/46 | (2006.01) |
| H02P 1/50 | (2006.01) |
| H02P 3/18 | (2006.01) |
| H02P 23/00 | (2006.01) |
| H02M 1/12 | (2006.01) |
| H02P 21/00 | (2006.01) |
| H02P 21/06 | (2006.01) |
| H02M 7/44 | (2006.01) |

(52) U.S. Cl.
CPC ........... *H02P 23/0095* (2013.01); *H02M 1/126* (2013.01); *H02M 7/44* (2013.01); *H02P 21/0003* (2013.01); *H02P 21/06* (2013.01)

(58) Field of Classification Search
CPC .................................. H02P 23/0095
USPC ........................................................ 318/721
See application file for complete search history.

(56) References Cited

U.S. PATENT DOCUMENTS

| | | | |
|---|---|---|---|
| 3,723,840 A | 3/1973 | Opal et al. | |
| 4,823,251 A * | 4/1989 | Kawabata et al. | 363/95 |
| 5,744,921 A | 4/1998 | Makaran | |
| 5,909,098 A | 6/1999 | Konecny et al. | |
| 5,959,431 A | 9/1999 | Xiang | |
| 6,124,697 A | 9/2000 | Wilkerson | |
| 6,208,537 B1 | 3/2001 | Skibinski et al. | |
| 6,329,781 B1 | 12/2001 | Matsui et al. | |
| 6,940,249 B2 | 9/2005 | Toyoda | |
| 7,102,323 B2 * | 9/2006 | Zhou et al. | 318/801 |

(Continued)

FOREIGN PATENT DOCUMENTS

| | | |
|---|---|---|
| EP | 1635448 A1 | 3/2006 |
| JP | 2001-025282 | 1/2001 |
| WO | WO2009093214 A2 | 7/2009 |

OTHER PUBLICATIONS

Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.

(Continued)

*Primary Examiner* — Erick Glass
(74) *Attorney, Agent, or Firm* — Fay Sharpe LLP

(57) ABSTRACT

Power converters and methods are presented for driving an AC load connected through an intervening filter circuit, in which at least one filter current or voltage signal or value is determined according to feedback signals or values representing an output parameter at an AC output of the power converter, and AC electrical output power is generated at the AC output based at least partially on the at least one filter current or voltage signal or value.

14 Claims, 4 Drawing Sheets

(56) References Cited

U.S. PATENT DOCUMENTS

| | | | |
|---|---|---|---|
| 7,679,308 | B2 | 3/2010 | Tomigashi |
| 7,724,549 | B2 | 5/2010 | Skibinski et al. |
| 7,979,223 | B2 | 7/2011 | Monti et al. |
| 7,990,097 | B2 * | 8/2011 | Cheng et al. .................. 318/800 |
| 8,009,450 | B2 | 8/2011 | Royak et al. |
| 8,288,886 | B2 | 10/2012 | Anwar et al. |
| 8,736,220 | B2 | 5/2014 | Ogawa et al. |
| 2005/0146306 | A1 | 7/2005 | Ha et al. |
| 2007/0007929 | A1 | 1/2007 | Lee et al. |
| 2008/0074074 | A1 | 3/2008 | Skibinski et al. |
| 2008/0312855 | A1 | 12/2008 | Monti et al. |
| 2009/0146592 | A1 | 6/2009 | Tobari et al. |
| 2011/0109155 | A1 | 5/2011 | Anwar et al. |

OTHER PUBLICATIONS

Batzel, Todd D. et al., "*Electric Propulsion With Sensorless Permanent Magnet Synchronous Motor: Implementation and Performance*", IEEE Transactions on Energy Conversion, vol. 20, No. 3, pp. 575-583, Sep. 2005.

Park, Jae-Do et al., "*Design and Control of Hiqh-Speed Solid-Rotor Synchronous Reluctance Drive With Three-Phase LC Filter*", downloaded on Sep. 24, 2009 from IEEE Xplore, pp. 715-722.

Salomäki, J. et al., "*Sensorless Vector Control of PMSM Drives Equipped With Inverter Output Filter*", in Proceedings of the 32$^{nd}$ Annual Conference of the IEEE Industrial Electronics Society (IECON 2006), Paris, France, pp. 1059-1064.

Kojima, Mari et al., "*Novel Vector Control System Using Deadbeat-Controlled PWM Inverter With Output LC Filter*", IEEE Transactions on Industry Applications, vol. 40, No. 1, pp. 162-169, Jan./Feb. 2004.

Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

Ryvkin, S. et al., "Sensorless Oil Drowned Pump Drive", IEEE ISIE 2005, Jun. 20-23, 2005, Dubrovnik, Croatia, pp. 963-968.

Agarlita, Sorin-Cristian et al., "I-f Starting and Active Flux Based Sensorless Vector Control of Reluctance Synchronous Motors, with Experiments", 12$^{th}$ Intl Conf. on Optimization of Electrical and Electronic Equipment, OPTIM 2010, pp. 337-342.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

"Guidelines for the Use of 400-600 Volt AC Drives in Medium Voltage Applications," Yaskawa Application Note, 2005.

Andreescu, G., et al. "Stable V/f Control System with Unity Power Factor for PMSM Drives", IEEE 13$^{th}$ Intl Conf. on Optimization of Electrical and Electronic Equipment (OPTIM), May 2012, pp. 432-438.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

European Search Report, EP14151417.4-1809, Applicant Rockwell Automation Technologies, Inc., The Hague, Completed Apr. 28, 2014, Mailed May 6, 2014, 10 pages.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Park et al., "Design and Control of High-Speed Solid-Rotor Synchronous Reluctance Drive With Three-Phase LC Filter", Conference Record of the 2005 IEEE Industry Applications Conf. 40$^{th}$ IAS Annual Meeting, vol. 1, Oct. 2, 2005, pp. 715-722.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

J. Liu et al., "Rotor Position Estimation for Synchronous Machines Based on Equivalent EMF", IEEE Transactions on Industry Applications, vol. 47, pp. 1310-1318, May-Jun. 2011.

Halkassari, Optimal U/F-Control of High Speed Permanent Magnet Motors, 2006, IEEE, pp. 2302-2308.

Fatu et al., I-F Starting Method With Smooth Transition to EMF. Based Motion-Sensorless Vector Control of PM Synchronous Motor/Generator, 2008, IEEE, pp. 1481-1487.

Kim et al., "PWM Switching Frequency Signal Injection Sensorless Methos in IPMSM", IEEE, 2011, pp. 3021-3028.

Yaskawa Technical Review, vol. 69, No. 2, AC Drive Drive, http://www.yaskawa.co.jp/en/technology/tech_news/69-2/t10.htm, retrieved from the Internet 11-26-2-14, 1 pg.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kobayashi et al., "Investigation of IPMSM's Position Estimation in Low Speed Region with DC Link Current Detection", IEEE Jan. 2007, pp. 1411-1416.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kukrer, "Deadbeat Control of a Three-Phase Inverter with an Output LC Filter", IEEE Transactions on Power Electronics, vol. 11, No. 1, Jan. 1996, 8 pgs.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

\* cited by examiner

METHOD AND APPARATUS FOR CONTROLLING POWER CONVERTER WITH INVERTER OUTPUT FILTER

BACKGROUND

Power conversion systems are used to generate and provide AC output power to a load, such as a single or multi-phase AC motor driven by an inverter stage of a motor drive power converter. Pulse width modulated (PWM) output inverters provide output currents and voltages including a number of pulses, and output filters are sometimes employed between the power converter and the driven load to reduce the high frequency content caused by pulse width modulation. The presence of the output filter between the power conversion system and the load, however, makes accurate control of the voltages and/or current provided to the load more difficult, as the power delivered to the load is different from that delivered to the input of the filter. In particular, the output inverter stage may be controlled according to feedback signals measured at the inverter output terminals, and these feedback values may not represent the currents or voltages ultimately provided to the load. Feedback sensors can be provided at the load itself for direct measurement of the load parameters, but this increases system cost, and may not be possible in all applications. Accordingly, there is a need for improved power conversion systems and techniques for driving a load through an intervening filter circuit by which load control can be facilitated without requiring extra feedback sensors positioned at the load and without significant modification to the inverter control system of the power converter.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

Power conversion systems and operating methodologies are disclosed for powering a load through an intervening filter circuit, which find utility in association with motor drives or other forms of power converters, and may be employed to power or drive any form of load, such as a single or multi-phase permanent magnet synchronous motor (PMSM). These techniques may be successfully implemented to facilitate improved control over driven motors and other loads without significant change to inverter controller configuration and without requiring the addition of direct feedback sensors at the load.

Power converters are disclosed, which include an inverter and an associated controller that determines one or more filter currents or voltages representing one or more filter capacitor currents or filter inductor voltages of the intervening filter circuit, based on one or more inverter output feedback signals or values. The controller provides inverter switching control signals based at least in part on the filter currents or voltages. In certain embodiments, the power converter may be a motor drive, with the inverter providing output power to drive a motor load through the intervening filter circuit.

In certain embodiments, the controller computes a current setpoint based on a desired velocity and motor velocity, and computes a filter capacitor current value according to the motor velocity, a compensated voltage reference, and a filter capacitance value. The controller computes a compensated current setpoint value based on the current setpoint and the filter capacitor current value, and provides the inverter switching control signals based at least partially on the compensated current setpoint.

In various embodiments, the controller computes a voltage reference based on the compensated current setpoint and on output current feedback representing an output current at the inverter output. The controller computes a feed forward voltage value based on the output current feedback, the motor velocity, the filter capacitor current value, and on a filter inductance value. The controller computes a compensated voltage reference value based on the voltage reference and the feed forward voltage reference, and provides the inverter switching control signals based at least partially on the compensated voltage reference value.

Methods are provided for controlling an AC electric motor connected to a motor drive through an intervening filter circuit. The method includes determining at least one filter current or voltage representing a filter capacitor current or filter inductor voltage of the intervening filter circuit based on at least one motor drive output feedback signal or value representing an output current at the AC output of the motor drive, and generating AC electrical output power at the motor drive output at least partially according to the filter current or voltage.

In certain embodiments, the method includes determining a filter capacitor current value representing current flowing in a filter capacitor of the intervening filter circuit based on a motor velocity signal or value, a compensated voltage reference value, and a filter capacitance value. The compensated current setpoint value is computed based at least partially on the filter capacitor current value, and the inverter switching control signals are provided at least partially according to the compensated current setpoint value.

Certain embodiments of the method further include determining at least one current setpoint signal or value based at least partially on a desired motor velocity and the motor velocity signal or value, as well as computing the compensated current setpoint value based on the current setpoint value and the filter capacitor current value.

In certain embodiments, moreover, the method includes computing a voltage reference value based on the compensated current setpoint value and at least one inverter output current feedback signal or value representing an output current at the inverter output. In addition, a feed forward voltage reference value is computed based on the inverter output current feedback signal(s) or value(s), and a compensated voltage reference value is determined based on the voltage reference value and the feed forward voltage reference value, with the inverter switching control signals being provided at least partially according to the compensated voltage reference value.

Non-transitory computer readable mediums are provided with computer executable instructions for controlling an AC electric motor connected to a motor drive through an intervening filter circuit according to the described methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
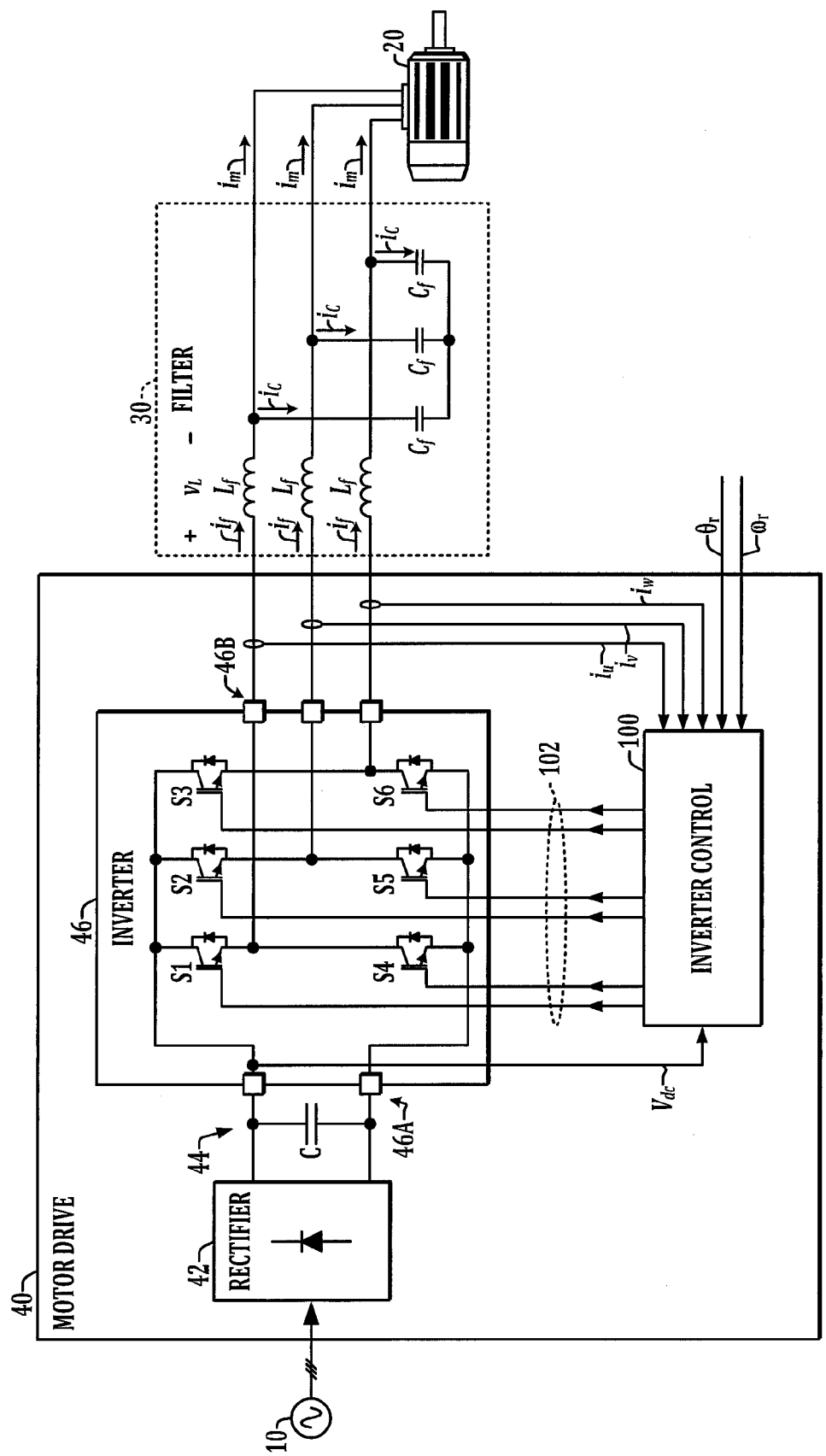
FIG. 1 is a simplified schematic diagram illustrating a motor drive with an inverter controller configured to control motor current based on sensed inverter output current signals or values while compensating for the presence of an output filter between the motor drive output and a driven permanent magnet synchronous motor (PMSM)

Referring now to the figures, several embodiments or implementations are hereinafter described in conjunction with the drawings, wherein like reference numerals are used to refer to like elements throughout, and wherein the various features are not necessarily drawn to scale.

Power converters and methods are disclosed for controlling a load connected through an intervening filter circuit, by which improved control may be facilitated without the addition of extra feedback sensors or extensive modifications to inverter output control schemes. These concepts are hereinafter described in the context of a motor drive power converter controlling an AC permanent magnet synchronous motor (PMSM), although the invention is not limited to motor drive type power converters, or to PMSM type loads. The described embodiments utilize only the measurements of inverter output currents (without directly sensing voltages and/or currents at the driven motor load), and hence facilitate the addition of an intervening filter to any motor drive/driven motor system without significantly impacting cost and/or complexity. Consequently, the presently disclosed power conversion systems and methods present a significant advance over attempts to introduce additional cascaded control loops, adaptive full-order observers, and/or other complicated processing components or steps into a PMSM inverter vector control architecture, and also facilitate improved motor control without requiring extra hardware or major changes in the control structure for a conventional PMSM drive or other type of power conversion system.

Disclosed examples include a simple control scheme for PMSM drives with an inverter output filter considering filter dynamics, without use of any additional hardware. Various embodiments, moreover, may be employed in a variety of power conversion systems, including without limitation voltage source AC drives equipped with an output filter, or power converters installed for driving a motor through an intervening output filter, whether the intervening filter circuit is integral to the drive or not. The disclosed apparatus and methods thus provide a simple solution to consider output filter dynamics with improved performance without major hardware or software changes on an existing drive. The disclosed techniques, moreover, require only the measurements of the inverter output current without additional sensors to provide direct voltage and/or current values from the driven load, and thus, a filter can be easily added to an existing drive without any hardware modifications. In certain embodiments, moreover, an improved current reference generator is provided, and a new feedforward control is provided for a current loop proportional/integral (PI) controller in an inverter controller.

FIG. 1 shows a permanent magnet synchronous motor (PMSM) drive 40 with an inverter 46 and an inverter controller 100 configured to control current of a driven motor load 20 based on sensed inverter output current signals or values $i_u$, $i_v$, $i_w$, representing output currents flowing at the AC output 46B of the inverter 46. The controller 100, moreover, is configured to compensate for the presence of an output filter 30 connected between the motor drive output 46B and the driven motor 20.

As seen in FIG. 1, the drive 40 receives single or multiphase AC input power from a power source 10 and converts this to a DC bus voltage using a rectifier 42 providing a DC output voltage to a DC link circuit 44 having a capacitor C. The rectifier 42 can be a passive rectifier including one or more diode rectifier components, or may be an active front end (AFE) system with one or more rectifier switching devices (e.g., IGBTs, etc.) and an associated rectifier controller (not shown) for converting input AC electrical power to provide the DC bus voltage in the link circuit 44. Other configurations are possible in which the drive 40 receives input DC power from an external source (not shown) to provide an input to the inverter 46, in which case the rectifier 42 may be omitted. The DC link circuit 44, moreover, may include a single capacitor C or multiple capacitors connected in any suitable series, parallel and/or series/parallel configuration to provide a DC link capacitance across the inverter input terminals 46A. In addition, while the illustrated motor drive 40 is a voltage source converter configuration including one or more capacitive storage elements in the DC link circuit 44, the various concepts of the present disclosure may be implemented in association with current source converter architectures in which a DC link circuit 44 includes one or more inductive storage elements, such as one or more series-connected inductors situated between the source of DC power (e.g., rectifier 42 or external DC source) and the input 46A of the inverter 46. In other possible implementations, the motor drive 40 includes a direct DC input to receive input power from an external source (not shown), and in certain embodiments the rectifier 42 and DC link circuit 44 may both be omitted.

The inverter 46 includes a DC input 46A having first and second (e.g., plus and minus) terminals connected to the DC link circuit 44, as well as a plurality of switching devices S1-S6 coupled between the DC input 46A and the motor drive AC output 46B. In operation, the inverter switching devices S1-S6 are actuated by inverter switching control signals 102 provided by the controller 100 in order to convert DC electrical power received at the DC input 46A to provide AC electrical output power at the AC output 46B. The filter circuit 30 receives the AC output from the inverter 46 of the motor drive 40, and is thereafter connected to the phase windings of the motor load 20. Although illustrated as driving a permanent magnet synchronous motor 20, the motor drive 40 can be employed in connection with other types of AC motor loads 20 and/or other forms of power converters to drive non-motor loads 20 using an output inverter 46. In the illustrated system, moreover, one or more feedback signals or values may be provided from the motor 20 itself, including a motor (e.g., rotor) position or angle signal $\theta_r$ and a motor speed or velocity signal w, although not a strict requirement of all embodiments of the present disclosure. In this regard, the motor drive 40 in certain embodiments implements a motor speed and/or position and/or torque control scheme in which the inverter controller 100 selectively provides the switching control signals 102 in a closed and/or open-loop fashion according to one or more setpoint values such as a motor speed setpoint $\omega_r^*$. In practice, the motor drive 40 may also receive a torque setpoint and/or a position (e.g., angle) setpoint, and such desired signals or values (setpoint(s)) may be received from a user interface and/or from an external device such as a distributed control system, etc. (not shown).

As seen in FIG. 1, moreover, the motor drive 40 is connected to the load 20 through an intervening filter circuit 30. In the illustrated example, the filter 30 is an "L-C" configuration in which each of the power converter output lines is connected to the motor through a series-connected filter inductor $L_f$, with a corresponding filter capacitor $C_f$ connected between the corresponding motor line and a common connection point (a neutral of a Y-connected set of filter capacitors $C_f$ in the illustrated example). Other implementations are possible in which the filter capacitors $C_f$ are connected in a "Delta" configuration. In the illustrated (Y-connected) configuration, moreover, the filter circuit neutral point can be optionally connected to a circuit ground or other, connection point associated with the motor drive 40, although not a strict requirement of the present disclosure. The disclosed apparatus and techniques can be employed in connection with other forms and types of filter circuits 30, including without limitation L-C-L circuits, etc., of which behavior can typically be modeled as a second order system. As seen in FIG. 1, moreover, the phase currents $i_m$ provided to the motor load 20 from the output of the filter circuit 30 will control the operation of the motor 20, whereas filter currents $i_c$ (i.e., filter capacitor currents) may flow in the filter capacitors $C_f$ and non-zero voltages $v_L$ (i.e., filter voltages) may develop across one or more of the filter inductors $L_f$, whereby simple closed-loop control based on measured inverter output current signals or values $i_u$, $i_v$, $i_w$ may result in less than optimal operation of the driven load 20. At the same time, however, directly measuring the motor currents $i_m$ and/or motor voltages would require additional hardware and cabling, which may not be economically feasible or technically possible in certain applications.

Figure 2:
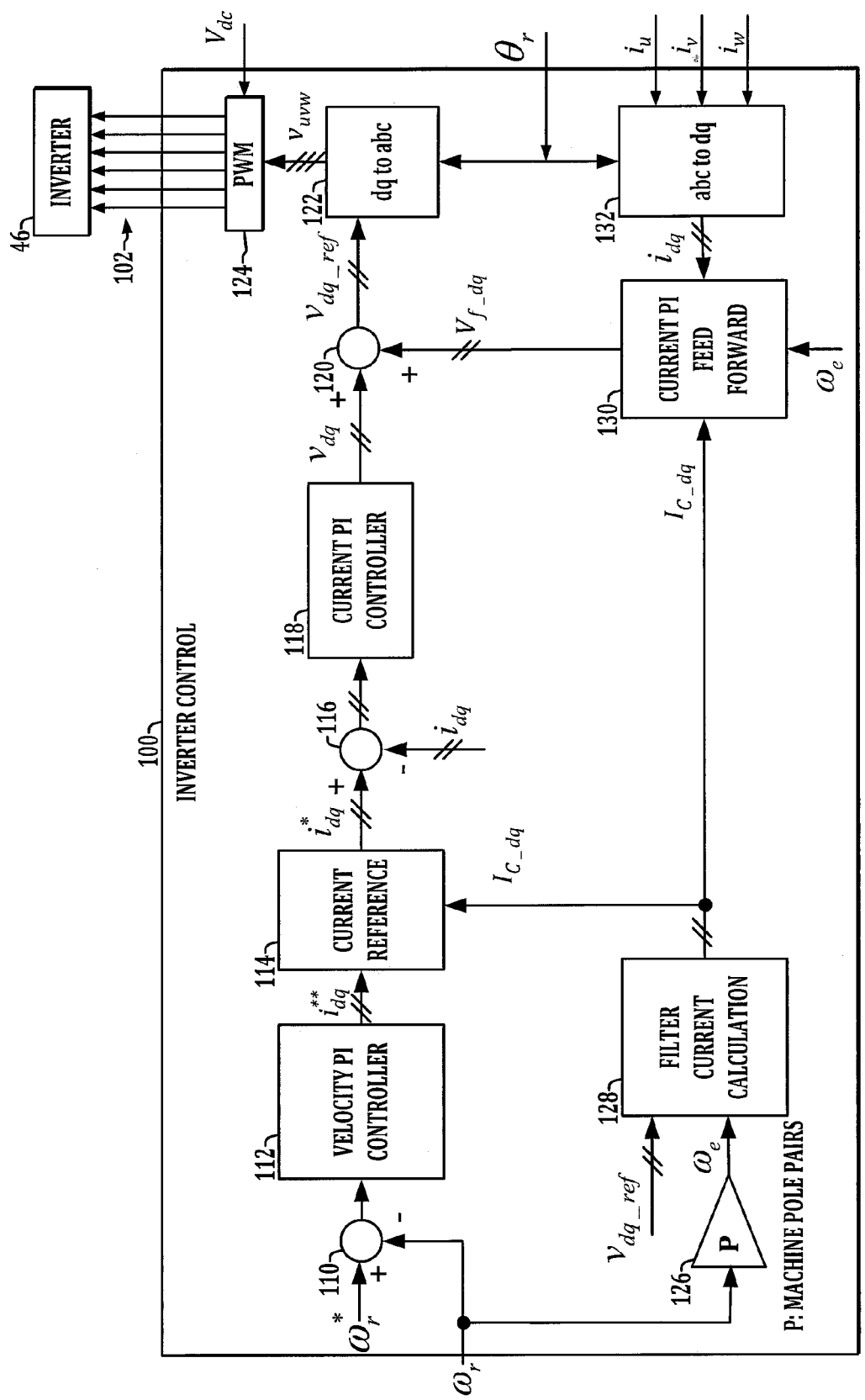
FIG. 2 is a schematic diagram illustrating further details of the inverter controller of FIG. 1.
Figure 3:
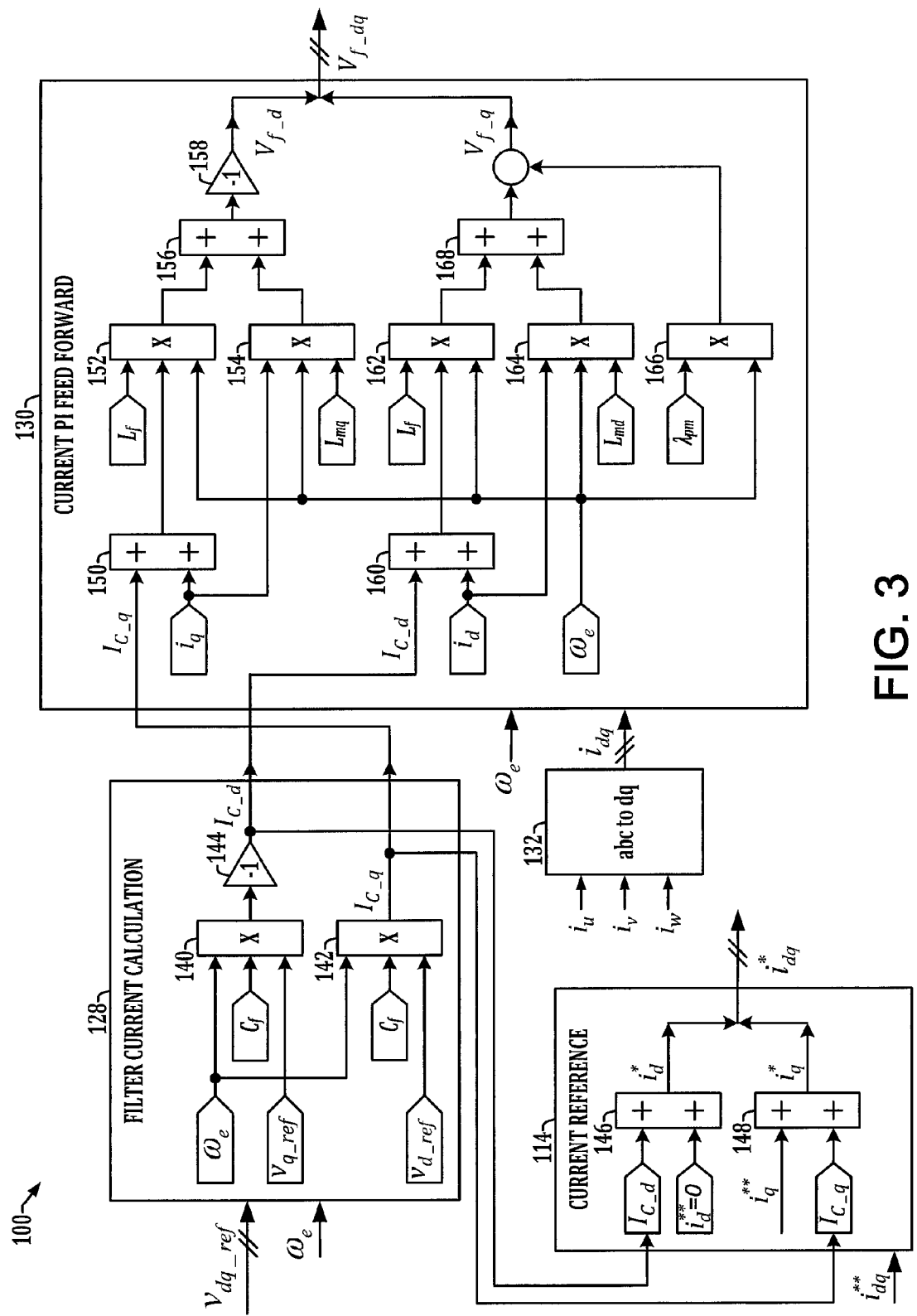
FIG. 3 is a schematic diagram illustrating further details of a filter current calculation component, a current reference component, as well as a current proportional-integral (PI) feed forward component of the inverter controller of FIGS. 1 and 2.
Figure 4:
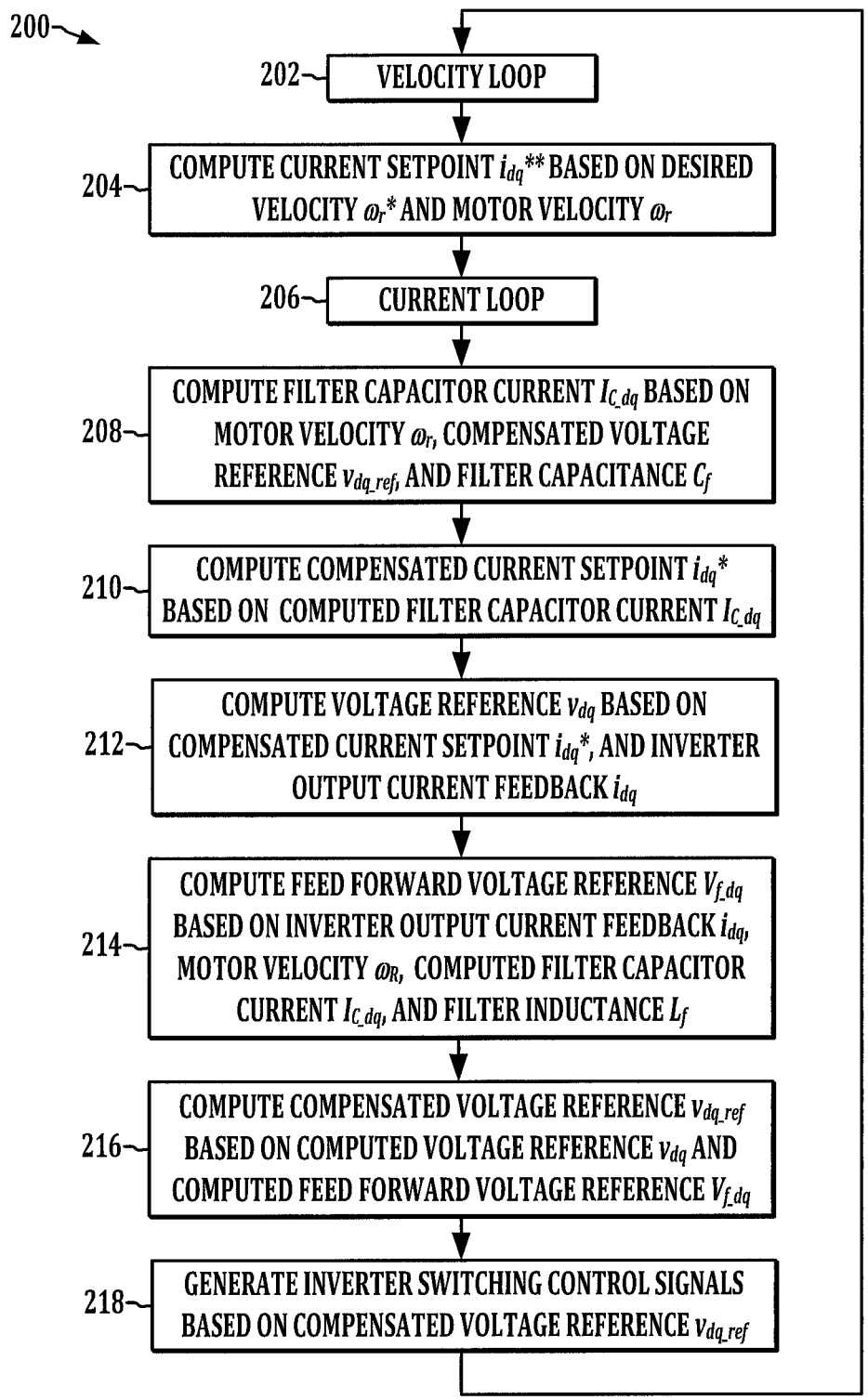
FIG. 4 is a flow diagram illustrating a process for driving a motor load through an intervening filter circuit.

Referring also to FIGS. 2-4, the drive 40 includes one or more current sensors configured to measure, sense, or otherwise detect at least one inverter output feedback signal or value (e.g., output currents $i_u$, $i_v$, $i_w$) which represent the output current at the AC output 46B of the inverter 46, and the controller 100 is programmed or otherwise configured to determine at least one filter current or voltage signal or value representing a filter capacitor current $i_c$ or filter inductor voltage $v_L$ of the intervening filter circuit 30 based at least in part on the inverter output feedback (e.g., $i_u$, $i_v$, $i_w$), and to provide the inverter switching control signals 102 at least partially according to the filter current or voltage signals or values. In this manner, the inverter controller 100 accommodates the presence of the filter circuit 30 between the motor drive output 46B and the driven motor load 20, without requiring addition of external sensors. Moreover, the controller 100 can implement an otherwise conventional motor control scheme without having to provide complicated observer components or otherwise modifying the closed loop control for driving the motor load 20. The controller 100 and the components thereof may be any suitable hardware, processor-executed software, processor-executed firmware, logic, or combinations thereof that are adapted, programmed, or otherwise configured to implement the functions illustrated and described herein. The controller 100 in certain embodiments may be implemented, in whole or in part, as software components executed using one or more processing elements and may be implemented as a set of sub-components or objects including computer executable instructions for operation using computer readable data executing on one or more hardware platforms such as one or more computers including one or more processors, data stores, memory, etc. The components of the controller 100 may be executed on the same computer processor or in distributed fashion in two or more processing components that are operatively coupled with one another to provide the functionality and operation described herein.

FIGS. 2 and 3 illustrate further details of a nonlimiting embodiment of the inverter controller 100, and FIG. 4 illustrates a process for driving a motor load 20 through an intervening filter circuit 30 which may be implemented in whole or in part via the inverter controller 100 in certain embodiments. As seen in FIG. 2, the inverter controller 100 receives a desired motor velocity signal or value $\omega_r^*$ (e.g., from a user interface or other setpoint source) along with a motor velocity signal or value $\omega_r$. The velocity signal or value $\omega_r$ can be obtained from any suitable source, and may be provided through, or derived from, feedback signals from the motor load 20 in certain embodiments, although not a strict requirement of the present disclosure. In addition, the controller 100 receives phase current feedback signals or values $i_u$, $i_v$, $i_w$ representing the output currents at the AC output 46B of the motor drive 40 (e.g., from output current sensors as seen in FIG. 1), and a DC bus voltage signal or value $V_{dc}$. The operating parameters and variables illustrated and described herein can be one or both of signals and/or values (e.g., digital values), and the controller 100 and other components of the motor drive 40 may include various analog-to-digital converters as well as digital-to-analog conversion components. Moreover, various parameters computed and used by the controller 100 and the components thereof may be represented in a synchronous reference frame (e.g., d-q frame in the illustrated examples), and such values may include a d-axis component and/or a q-axis component. In addition, certain values (e.g., the inverter output current feedback signals or values $i_u$, $i_v$, $i_w$) may include signals or values corresponding to individual output phases (e.g., u, v, w) of a multiphase system, such as the inverter output phases.

A summing junction 110 (FIG. 2) provides a speed or velocity error signal to a velocity proportional-integral (PI) controller 112 as the difference between the desired velocity $\omega_r^*$ and the motor velocity signal or value $\omega_r$. Using the velocity PI controller component 112, the controller 100 thus calculates or otherwise determines one or more current setpoint signals or values $i_{dq}^{**}$ (e.g., a d-axis value and a q-axis value in certain embodiments) at least partially according to the desired motor velocity $\omega_r^*$ and the motor velocity signal or value $\omega_r$. As mentioned above, although the illustrated example uses an outer velocity control loop, other implementations are possible in which a torque setpoint or other setpoint(s) is/are used in controlling operation of the motor load 20. Moreover, the concepts of the present disclosure may be employed in connection with other (non-motor) AC loads 20 driven through an intervening filter circuit 30, wherein the inverter controller 100 in such alternate embodiments may employ any suitable type of setpoint and control algorithm, wherein the controller 100 need not control velocity or position or torque in all embodiments.

The exemplary controller 100 in FIG. 2 further implements an inner current loop to control the inverter output currents $i_u$, $i_v$, $i_w$. A current reference component 114 receives the d and q-axis current setpoint signals or values $i_{dq}^{**}$ from the velocity PI controller 112, along with one or more signals or values $I_{C\_dq}$ representing the currents is flowing in the filter capacitors $C_f$ of the filter circuit 30. FIG. 3 illustrates further details of one implementation of the current reference component 114, as well as a filter current calculation component 128 and a current proportional-integral (PI) feed forward component 130 of the inverter controller 100. As seen in FIG. 2, the current reference component 114 provides compensated current setpoint values i*$_{dq}$ to a summing junction 116 based on the d and q-axis current setpoint values i**$_{dq}$ and the filter capacitor current values I$_{C\_dq}$. The summing junction 116, in turn, provides at least one error signal (e.g., including d-axis and q-axis components) to a current PI controller component 118 based on the difference between the compensated current setpoint values i*$_{dq}$ and the d-q current feedback values i$_{dq}$ obtained from a stationary/synchronous reference frame converter component 132. The current PI control component 118 provides a control output as one or more voltage reference values v$_{dq}$ to a summing junction 120 to provide an inner voltage control loop implemented by the controller 100.

A summing junction component 120 computes or otherwise generates one or more compensated voltage reference values v$_{dq\_ref}$ based on the sum of the voltage reference values v$_{dq}$ and feed forward voltage reference values V$_{f\_dq}$, and provides these to a synchronous/stationary reference frame converter component 122. The converter component 122 (and the stationary/synchronous reference frame converter component 132) also receives a motor angle or position input signal or value θ$_r$ (e.g., from a feedback sensor associated with the motor load 20 or derived from a position estimation algorithm, or from another suitable source) and the converter 122 converts the compensated voltage reference values v$_{dq\_ref}$ to provide 3-phase (stationary reference frame) voltage reference signals v$_{uvw}$ to a PWM component 124, which generates inverter switching control signals 102 for operation of the switching devices S1-S6 of the inverter 46 accordingly. The PWM component 124 may include suitable driver circuitry and/or other suitable hardware for generating switching control signals 102 suitable for operating the switching devices S1-S6 as are known.

As further shown in FIG. 2, moreover, the illustrated inverter controller 100 receives the speed/motor velocity signal or value ω$_r$ and may optionally derive a scaled motor velocity signal or value ω$_e$ from 126 as a function of an integer number P representing the number of pole pairs of the driven motor load 20. A filter current calculation component 128 receives the scaled motor velocity signal or value ω$_e$ along with the compensated voltage reference signals or values v$_{dq\_ref}$, and provides the synchronous reference frame filter capacitor current values I$_{C\_dq}$ for use by the current reference component 114 as described above, as well as to a current proportional-integral (PI) feed forward control component 130. Current PI feedforward component 130 receives the filter capacitor current values I$_{C\_dq}$, the scaled motor velocity signal or value ω$_e$, and the synchronous reference frame current feedback values i$_{dq}$ as inputs, and determines the feedforward voltage reference values V$_{f\_dq}$ for provision to the summing junction component 120 as described above. In operation, the controller 100 determines one or more filter current or voltage signals or values representing a filter capacitor current (e.g., i$_C$) or filter inductor voltage (e.g., v$_L$) of the filter circuit 30 based on at least one inverter output feedback signal or value (e.g., i$_u$, i$_v$, i$_w$) representing an output current at the AC output 46B of the inverter 46. The controller 100, moreover, provides the inverter switching control signals 102 to the inverter 46 at least partially according to the filter current or voltage signal(s) or value(s).

The inventors have appreciated that the stationary reference frame (d-q) equations for a PM synchronous machines are given by the following equation (1):

$$\begin{bmatrix} v_{md} \\ v_{mq} \end{bmatrix} = \begin{bmatrix} R_s + \frac{d}{dt}L_{sd} & -\omega L_{sq} \\ \omega L_{sd} & R_s + \frac{d}{dt}L_{sq} \end{bmatrix} \cdot \begin{bmatrix} i_{md} \\ i_{mq} \end{bmatrix} + \omega\lambda_{pm}\begin{bmatrix} 0 \\ 1 \end{bmatrix}. \quad (1)$$

In addition, cross coupling terms are introduced by the rotation from the stationary (uvw) reference frame to the synchronous (d-q) reference frame, as seen in the following equation (2):

$$\frac{d[x]_{abc}}{dt} \Rightarrow \frac{d[x]_{dq}}{dt} + \begin{bmatrix} 0 & -\omega \\ \omega & 0 \end{bmatrix}[x]_{dq}. \quad (2)$$

Assuming the filter inductance L$_f$ and capacitance C$_f$ are constants, and noting that motor voltages v$_m$ equal to filter output voltages v$_{f\_out}$, the voltage across the inductor v$_L$ is expressed by the following equation (3):

$$\begin{bmatrix} v_{Ld} \\ v_{Lq} \end{bmatrix} = L_f \cdot \frac{d}{dt}\begin{bmatrix} 1 & 0 \\ 0 & 1 \end{bmatrix} \cdot \begin{bmatrix} i_{fd} \\ i_{fq} \end{bmatrix} + \begin{bmatrix} 0 & -\omega L_f \\ \omega L_f & 0 \end{bmatrix} \cdot \begin{bmatrix} i_{fd} \\ i_{fq} \end{bmatrix}, \quad (3)$$

and the capacitor current is expressed by the following equation (4):

$$\begin{bmatrix} i_{cd} \\ i_{cq} \end{bmatrix} = C_f \cdot \frac{d}{dt}\begin{bmatrix} 1 & 0 \\ 0 & 1 \end{bmatrix} \cdot \begin{bmatrix} v_{f\_out\_d} \\ v_{f\_out\_q} \end{bmatrix} + \begin{bmatrix} 0 & -\omega C_f \\ \omega C_f & 0 \end{bmatrix} \cdot \begin{bmatrix} v_{f\_out\_d} \\ v_{f\_out\_q} \end{bmatrix}. \quad (4)$$

The inverter currents in the synchronous d-q reference frame are given by the following equation (5):

$$\begin{bmatrix} i_{fd} \\ i_{fq} \end{bmatrix} = \begin{bmatrix} i_{md} \\ i_{mq} \end{bmatrix} + \begin{bmatrix} i_{cd} \\ i_{cq} \end{bmatrix} = \begin{bmatrix} i_{md} \\ i_{mq} \end{bmatrix} + \quad (5)$$

$$C_f \cdot \frac{d}{dt}\begin{bmatrix} 1 & 0 \\ 0 & 1 \end{bmatrix} \cdot \begin{bmatrix} v_{f\_out\_d} \\ v_{f\_out\_q} \end{bmatrix} + \begin{bmatrix} 0 & -\omega C_f \\ \omega C_f & 0 \end{bmatrix} \cdot \begin{bmatrix} v_{f\_out\_d} \\ v_{f\_out\_q} \end{bmatrix}$$

In steady state, the inverter output currents (I$_{fd}$ and I$_{fq}$ in the synchronous d-q reference frame) provided to the filter 30 are given by the following equation (6):

$$\begin{bmatrix} I_{fd} \\ I_{fq} \end{bmatrix} = \begin{bmatrix} I_{md} \\ I_{mq} \end{bmatrix} + \begin{bmatrix} 0 & -\omega C_f \\ \omega C_f & 0 \end{bmatrix} \cdot \begin{bmatrix} v_{f\_out\_d} \\ v_{f\_out\_q} \end{bmatrix}, \quad (6)$$

including a first term representing the original motor current references from the speed regulator (velocity PI controller 112), and the final term showing the cross coupling terms in the inverter output current references taking into account the filter capacitor currents. The steady state inductor voltages V$_{Ld}$ and V$_{Lq}$ are given by the following equation (7):

$$\begin{bmatrix} V_{Ld} \\ V_{Lq} \end{bmatrix} = \begin{bmatrix} 0 & -\omega L_f \\ \omega L_f & 0 \end{bmatrix} \cdot \begin{bmatrix} I_{fd} \\ I_{fq} \end{bmatrix} = \quad (7)$$

-continued $$\begin{bmatrix} 0 & -\omega L_f \\ \omega L_f & 0 \end{bmatrix} \cdot \left( \begin{bmatrix} I_{md} \\ I_{mq} \end{bmatrix} + \begin{bmatrix} 0 & -\omega C_f \\ \omega C_f & 0 \end{bmatrix} \cdot \begin{bmatrix} v_{f\_out\_d} \\ v_{f\_out\_q} \end{bmatrix} \right).$$

In addition, the feedforward (FF) terms $V_{f\_dq}$ for the current PI control component 118 including inductor voltages $V_{Ld}$ and $V_{Lq}$ in steady state, are given by the following equation (8):

$$\begin{bmatrix} V_{f\_d} \\ V_{f\_q} \end{bmatrix} \begin{bmatrix} C & -\omega L_{sq} \\ \omega L_{sd} & 0 \end{bmatrix} \cdot \begin{bmatrix} I_{md} \\ I_{mq} \end{bmatrix} + \begin{bmatrix} 0 \\ \omega \lambda_{pm} \end{bmatrix} + \quad (8)$$
$$\begin{bmatrix} 0 & \omega L_f \\ \omega L_f & 0 \end{bmatrix} \cdot \left( \begin{bmatrix} I_{md} \\ I_{mq} \end{bmatrix} - \begin{bmatrix} 0 & \omega C_f \\ \omega C_f & 0 \end{bmatrix} \cdot \begin{bmatrix} v_{f\_out\_d} \\ v_{f\_out\_q} \end{bmatrix} \right)$$

including an original feedforward term as well as an additional feedforward term representing the inductor voltages $V_{Ld}$ and $V_{Lq}$. In this manner, the illustrated controller 100 employs a feedforward inverter control scheme modified to incorporate the additional voltages and currents associated with the filter circuit 30. To eliminate the need to sense $V_{f\_out\_dq}$, the controller can replace $V_{f\_out\_dq}$ with the compensated controller voltages $v_{dq\_ref}$ in certain implementations.

FIG. 3 illustrates further details of non-limiting embodiments of the current reference component 114, the filter current calculation component 128, and the current PI feedforward control component 130, and FIG. 4 provides a flow diagram 200 depicting a control process 200 that may be implemented in the inverter controller 100. While the method 200 of FIG. 4 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, processor-executed software, or combinations thereof, in order to provide the motor control and inverter control functionality described herein, and may be employed in any power conversion system including but not limited to the above illustrated PMSM drive 40, wherein the disclosure is not limited to the specific applications and embodiments illustrated and described herein.

A velocity loop proceeds at 202 (FIG. 4) and the controller 100 computes current setpoint values $i^{**}_{dq}$ at 204 based on the desired velocity value $\omega_r^*$ and the motor velocity signal or value $\omega_r$, for example, using the summing junction component 110 and the velocity PI controller 112 shown in FIG. 2. The current loop begins at 206, and the controller computes the filter capacitor current values $I_{C\_dq}$ at 208 using the filter current calculation component 128 of FIG. 2, which represents the current flowing in the filter circuit capacitor $C_f$ based on the motor velocity signal or value $\omega_r$, the compensated voltage reference values $v_{dq\_ref}$ and the filter capacitance value $C_f$. A non-limiting example of the filter current calculation component 128 is further shown in FIG. 3, in which the d and q-axis filter capacitor current components $I_{C\_d}$ and $I_{C\_q}$ are computed as a function of these values $\omega_r$, $v_{dq\_ref}$, and $C_f$ using multiplier subcomponents 140 and 142 and a sign change component 144 (e.g., multiply by −1) according to the above equation (4).

At 210 in FIG. 4, the controller 100 computes the compensated current setpoint values $i^*_{dq}$, based on the current setpoint values $i^{**}_{dq}$ and the filter capacitor current values $I_{C\_dq}$ using the current reference component 114 (FIG. 2). As further shown in FIG. 3, a non-limiting embodiment of the current reference computation component 114 is illustrated, which computes the compensated current setpoint values $i^*_{dq}$ as a function of $i^{**}_{dq}$ and the d-q reference frame filter capacitor current values $I_{C\_d}$ and $I_{C\_q}$ received from the filter current calculation component 128 using summation components 146 and 148.

The compensated current reference setpoints (e.g., d and q axis component values $i^*_{dq}$) are then used as setpoints for the inner voltage control loops in FIG. 2 whereby the inverter switching control signals 102 are provided to the inverter 46 at least partially according to the compensated current setpoints $i^*_{dq}$. The controller 100 computes voltage reference values $V_{dq\_ref}$ at 212-216 based on the current PI feedforward control component 130 of FIGS. 2 and 3. As best seen in FIG. 3, the current PI feedforward component 130 includes summation components 150, 156, 160 and 168, as well as multiplier components 152, 154, 162, 164 and 166, and a sign change component 158 (e.g., multiply by −1) to implement the computation shown in the above equation (8). In the illustrated embodiment, the current PI feedforward control component 130 computes the feed forward voltage references $V_{f\_dq}$ in the synchronous reference frame at 214 based on the inverter output current feedback $i_{dq}$, the motor velocity $\omega_r$ (e.g., or the scaled value $\omega_e$), the filter capacitor currents $I_{C\_dq}$, and the filter inductance value $L_f$. The computed feed forward voltage references $V_{f\_dq}$ are then provided to the summing junction 120 (FIG. 2) for computation of the compensated voltage reference values $v_{dq\_ref}$ (e.g., at 216 in FIG. 4) based on the voltage reference values $v_{dq}$ from the current PI controller 118 and the feed forward voltage reference values $V_{f\_dq}$. At 218 in FIG. 4, the controller 100 generates or otherwise provides the inverter switching control signals 102 to the inverter 46 at least partially according to the compensated voltage reference values $V_{dq\_ref}$.

In accordance with further aspects of the present disclosure, a non-transitory computer readable medium is provided, such as a computer memory, a memory within a power converter control system (e.g., controller 100), a CD-ROM, floppy disk, flash drive, database, server, computer, etc.), which includes computer executable instructions for performing the above-described methods. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other The following is claimed:

1. A power conversion system for driving a load through an intervening filter circuit, the power conversion system comprising:
an inverter comprising a DC input, an AC output, and a plurality of switching devices coupled between the DC input and the AC output and operative according to inverter switching control signals to convert DC electrical power received at the DC input to provide AC electrical output power at the AC output;
a controller configured to determine at least one filter current or voltage signal or value representing a filter capacitor current or filter inductor voltage of the intervening filter circuit based on at least one inverter output feedback signal or value representing an output current at the AC output of the inverter, and to provide the inverter switching control signals to the inverter at least partially according to the at least one filter current or voltage signal or value;
wherein the controller is operative to:
compute at least one current setpoint value based on a desired velocity value and a motor velocity signal or value;
compute a filter capacitor current value representing current flowing in a filter capacitor of the intervening filter circuit based on: the motor velocity signal or value, a compensated voltage reference value, and a filter capacitance value;
compute a compensated current setpoint value based on the at least one current setpoint value and the filter capacitor current value; and
provide the inverter switching control signals to the inverter at least partially according to the compensated current setpoint value.

2. The power conversion system of claim 1, wherein the controller is operative to:
compute a voltage reference value based on the compensated current setpoint value, and at least one inverter output current feedback signal or value representing an output current at the AC output of the inverter;
compute a feed forward voltage reference value based on the at least one inverter output current feedback signal or value, the motor velocity signal or value, the filter capacitor current value, and a filter inductance value;
compute a compensated voltage reference value based on the voltage reference value, and the feed forward voltage reference value; and
provide the inverter switching control signals to the inverter at least partially according to the compensated voltage reference value.

3. The power conversion system of claim 1, wherein the power conversion system is a motor drive, and wherein the inverter provides the AC electrical output power at the AC output to drive a motor load through the intervening filter circuit.

4. The power conversion system of claim 3, wherein the controller is operative to:
compute a voltage reference value based on a compensated current setpoint value, and at least one inverter output current feedback signal or value representing an output current at the AC output of the inverter;
compute a feed forward voltage reference value based on the at least one inverter output current feedback signal or value, a motor velocity signal or value, a filter capacitor current value, and a filter inductance value;
compute a compensated voltage reference value based on the voltage reference value, and the feed forward voltage reference value; and
provide the inverter switching control signals to the inverter at least partially according to the compensated voltage reference value.

5. A method for controlling an AC electric motor connected to a motor drive through an intervening filter circuit, the method comprising:
determining at least one filter current or voltage signal or value representing a filter capacitor current or filter inductor voltage of the intervening filter circuit based on at least one motor drive output feedback signal or value representing an output current at an AC output of the motor drive; and
generating AC electrical output power at an AC output of the motor drive at least partially according to the at least one filter current or voltage signal or value;
determining a filter capacitor current value representing current flowing in a filter capacitor of the intervening filter circuit based on: a motor velocity signal or value, a compensated voltage reference value, and a filter capacitance value;
computing a compensated current setpoint value based at least partially on the filter capacitor current value; and
providing inverter switching control signals to an inverter of the motor drive at least partially according to the compensated current setpoint value.

6. The method of claim 5, comprising:
determining at least one current setpoint signal or value based at least partially on a desired motor velocity and the motor velocity signal or value; and
computing the compensated current setpoint value based on the at least one current setpoint value and the filter capacitor current value.

7. The method of claim 6, comprising:
computing a voltage reference value based on the compensated current setpoint value, and at least one inverter output current feedback signal or value representing an output current at the AC output of the inverter;
computing a feed forward voltage reference value based on the at least one inverter output current feedback signal or value, the motor velocity signal or value, the filter capacitor current value, and a filter inductance value;
computing a compensated voltage reference value based on the voltage reference value, and the feed forward voltage reference value; and
providing the inverter switching control signals to the inverter at least partially according to the compensated voltage reference value.

8. The method of claim 7, comprising:
receiving a plurality of motor drive output feedback signals or values representing output currents at an AC output of the motor drive;
determining d and q axis inverter output current feedback signals or values in a stationary reference frame based at least partially on the plurality of motor drive output feedback signals or values;
computing the voltage reference value based on the compensated current setpoint value, and the d and q axis inverter output current feedback signals or values; and
computing the feed forward voltage reference value based on the d and q axis inverter output current feedback signals or values, the motor velocity signal or value, the filter capacitor current value, and the filter inductance value.

9. The method of claim 5, comprising:
computing a voltage reference value based on a compensated current setpoint value, and at least one inverter output current feedback signal or value representing an output current at the AC output of the inverter;
computing a feed forward voltage reference value based on the at least one inverter output current feedback signal or value, a motor velocity signal or value, a filter capacitor current value, and a filter inductance value;
computing a compensated voltage reference value based on the voltage reference value, and the feed forward voltage reference value; and
providing inverter switching control signals to an inverter of the motor drive at least partially according to the compensated voltage reference value.

10. The method of claim 9, comprising:
receiving a plurality of motor drive output feedback signals or values representing output currents at an AC output of the motor drive;
determining d and q axis inverter output current feedback signals or values in a stationary reference frame based at least partially on the plurality of motor drive output feedback signals or values;
computing the voltage reference value based on the compensated current setpoint value, and the d and q axis inverter output current feedback signals or values; and
computing the feed forward voltage reference value based on the d and q axis inverter output current feedback signals or values, the motor velocity signal or value, the filter capacitor current value, and the filter inductance value.

11. A non-transitory computer readable medium with computer executable instructions for controlling an AC electric motor connected to a motor drive through an intervening filter circuit, the computer readable medium comprising computer executable instructions for:
determining at least one filter current or voltage signal or value representing a filter capacitor current or filter inductor voltage of the intervening filter circuit based on at least one motor drive output feedback signal or value representing an output current at an AC output of the motor drive;
generating AC electrical output power at an AC output of the motor drive at least partially according to the at least one filter current or voltage signal or value:
determining a filter capacitor current value representing current flowing in a filter capacitor of the intervening filter circuit based on: a motor velocity signal or value, a compensated voltage reference value, and a filter capacitance value;
computing a compensated current setpoint value based at least partially on the filter capacitor current value; and
providing inverter switching control signals to an inverter of the motor drive at least partially according to the compensated current setpoint value.

12. The computer readable medium of claim 11, comprising computer executable instructions for:
determining at least one current setpoint signal or value based at least partially on a desired motor velocity and the motor velocity signal or value; and
computing the compensated current setpoint value based on the at least one current setpoint value and the filter capacitor current value.

13. The computer readable medium of claim 12, comprising computer executable instructions for:
computing a voltage reference value based on the compensated current setpoint value, and at least one inverter output current feedback signal or value representing an output current at the AC output of the inverter;
computing a feed forward voltage reference value based on the at least one inverter output current feedback signal or value, the motor velocity signal or value, the filter capacitor current value, and a filter inductance value;
computing a compensated voltage reference value based on the voltage reference value, and the feed forward voltage reference value; and
providing the inverter switching control signals to the inverter at least partially according to the compensated voltage reference value.

14. The computer readable medium of claim 11, comprising computer executable instructions for:
computing a voltage reference value based on a compensated current setpoint value, and at least one inverter output current feedback signal or value representing an output current at the AC output of the inverter;
computing a feed forward voltage reference value based on the at least one inverter output current feedback signal or value, a motor velocity signal or value, a filter capacitor current value, and a filter inductance value;
computing a compensated voltage reference value based on the voltage reference value, and the feed forward voltage reference value; and
providing inverter switching control signals to an inverter of the motor drive at least partially according to the compensated voltage reference value.

* * * * *